350-357 SR

7/1/80 XR 4,210,907

United States Patent [19]

[11] 4,210,907

[45] Jul. 1, 1980

Hamada et al.

[54] UNIFORM COLORATION CONTROL IN AN ELECTROCHROMIC DISPLAY OF THE SEGMENTED TYPE

[75] Inventors: Hiroshi Hamada; Hiroshi Take; Yasuhiko Inami, all of Tenri; Hisashi Uede, Yamatokoriyama, all of Japan

[73] Assignee: Sharp Kabushiki Kaisha, Osaka, Japan

[21] Appl. No.: 893,513

[22] Filed: Apr. 4, 1978

[30] Foreign Application Priority Data

Apr. 4, 1977 [JP] Japan ........................ 52-38631

[51] Int. Cl.[2] .................. G06F 3/14; G09F 9/32

[52] U.S. Cl. .................... 340/785; 340/763; 340/811; 350/357

[58] Field of Search ....... 340/324 EC, 324 R, 324 M, 340/336, 763, 785, 811, 812, 814; 350/357

[56] References Cited

U.S. PATENT DOCUMENTS 3,950,077 4/1976 Jasinski ........................ 340/324

4,057,739 11/1977 Otake ........................ 340/324

*Primary Examiner*—Marshall M. Curtis

*Attorney, Agent, or Firm*—Birch, Stewart, Kolasch & Birch

[57] ABSTRACT

A driving system is provided for an electrochromic display device in which the coloration state is maintained for several hours through several days of the removal of the coloration voltage as long as the electrochromic display device is held in an electrically opened state. The electrochromic display device includes a predetermined number of display segments, each of the combinations of the display segments defining a different one of the desired display patterns. The display segments placed in the coloration state are electrically connected to each other during the memory period in order to uniform the coloration degree of each of the selected display segments. In a preferred form, a detection means is provided for detecting the potential of the selected display segments, which are held in the memory coloration state. The write-in, or, coloration operation is again conducted when the potential of the selected display segments becomes higher than a preselected level.

8 Claims, 13 Drawing Figures

UNIFORM COLORATION CONTROL IN AN ELECTROCHROMIC DISPLAY OF THE SEGMENTED TYPE

BACKGROUND OF THE INVENTION

The present invention relates to a driving system for an electrochromic display device which includes an electrochromic material held in two electrode carrying support plates to manifest reversible variations in the light absorption properties upon current supplied.

Generally, there are two types of electrochromic displays (ECD). The first type of ECD utilizes an electrically-induced chemical reduction of a colorless liquid to produce a colored, insoluble film on an electrode surface. The second type of ECD employs an inorganic solid film formed on electrodes, wherein the color variation is produced by the change in the opacity of the inorganic solid film.

The inorganic solid film used in the second type of ECD is the film of the transition metal oxide material such as tungsten oxide ($WO_3$). Such film cooperates with a liquid electrolyte. A typical system of the second type ECD is disclosed in B. W. Faughnan et al, RCA Review 36 177 (1975).

Various driving systems are proposed for the electrochromic displays. The electrochromic displays inherently possess the memory characteristics, which maintains the colored state for several hours through several days after the applied voltage is removed. Therefore, it is important to effectively use the above-mentioned memory characteristics in order to minimize the power dissipation of the driver circuit. Moreover, the coloration degree of each of the colored segments should be maintained uniform to enhance the display quality.

OBJECTS AND SUMMARY OF THE INVENTION

Accordingly, an object of the present invention is to provide an improvement in a driving system for electrochromic displays which can enhance the legibility of a visual display provided by the electrochromic displays.

Another object of the present invention is to uniform the coloration degree of each of the selected segment electrodes in an electrochromic display of the segmented type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention involves an improvement in the drive system for an electrochromic display device which includes a predetermined number of display segments, each of combinations of the display segments defining a diffferent one of desired display patterns.

To achieve the above objects, pursuant to an embodiment of the present invention, the display segments placed in the coloration state are electrically connected to each other during the memory period in order to maintain uniform the coloration degree of each of the selected display segments. In a preferred form, a detection means is provided for detecting the potential of the selected display segments, which are held in the memory coloration state. The coloration operation is again conducted when the potential of the selected display segments becomes higher than a preselected level.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
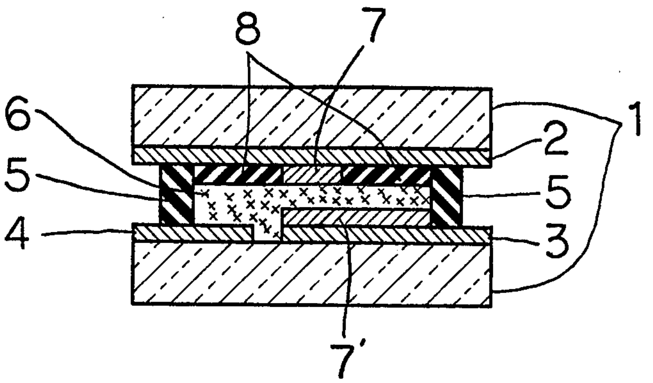
FIG. 1 is a cross-sectional view of a basic structure of an electrochromic display device suited for the driving system of the present invention.

FIG. 1 shows a basic structure of an electrochromic display device which includes an inorganic solid film formed on electrodes, and a liquid electrolyte.

Two transparent substrates 1 such as a glass substrate define the electrochromic display device. A transparent display electrode 2 is formed on one of the transparent substrates 1. A counter electrode 3 and a reference electrode 4 are formed on the other transparent substrate 1. A film of an electrochromic material 7 is formed on the transparent display electrode 2 in a desired configuration, and a film of an electrochromic material 7' is formed on the counter electrode 3. An insulator film 8 is formed on the display electrode 2 at positions where the film 7 is not formed. The thus formed two substrates 1 are fixed to each other with the intervention of a spacer 5, and a liquid electrolyte 6 is filled in the cell.

When an electric current flows through the cell from the counter electrode 3 to the display electrode 2, the display electrode 2 is colored. The coloration degree is substantially proportional to the amount of charges flowing through the cell. When the electric current flows in the counter direction, the display electrode 2 is bleached, or, the display electrode 2 is returned to the colorless state.

Transmittance T(λ) of the display electrode 2 against a light beam of the wavelength λ can be formulated as follows before the coloration is saturated.

$$-\log T(\lambda)=\epsilon(\lambda)\cdot\sigma$$

where:

σ is the charge amount flowing through a unit area; and

ε(λ) is a proportional constant inherently held by the electrochromic material against the light beam of the wavelength λ.

When the electrochromic material film is made of a $WO_3$ film, the proportional constant ε(λ) is as follows against the light beam of the wavelength 590 nm.

$$\epsilon(\lambda=590\text{nm})=30\text{–}40\ (\text{cm}^2/\text{coulomb})$$

The coloration operation is considered as follows:

$$\underset{\text{(transparent)}}{WO_3 + xM^+ + xe^-} \rightleftarrows \underset{\text{(blue)}}{M_x^+\ WO_3e_x^-}$$

where:

$M^+$ is $H^+$, $Li^+$, $Na^+$, $K^+$, etc.

The above-mentioned ECD has the following characteristic feactures, in general:

(1) the viewing angle is extremely wide;

(2) contrast is very high and is independent from the viewing angle;

(3) low voltage drive (below several volts);

(4) memory effects are expected, which maintains the coloration state for several hours through several days after the coloration voltage is removed as long as ECDs are held in an electrically opened state. Of course, the memory effects require no externally supplied power;

(5) the coloration degree is determined by the change amount flowing through a cell; and (6) energy consumption is proportional to the display size and the repetition number of the coloration-bleaching cycle.

The ECDs are suited for a display device of a portable electronic apparatus because they operate at a low voltage generated from a power cell.

Generally, there are three types of driving methods for ECD. That is, the ECD is driven in a method either one of the constant potential type, the constant current type, and the constant voltage type.

CONSTANT POTENTIAL DRIVE

Figure 2:
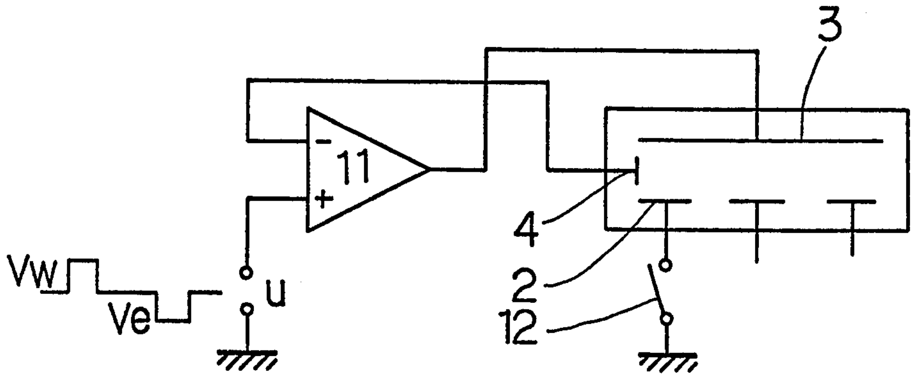
FIG. 2 is a circuit diagram of a typical driver circuit of the constant potenatial type for ECD.

FIG 2. shows a typical driver circuit of the constant potential type. In the constant potential type, the voltage applied to the counter electrode 3 is controlled so that a voltage difference between the display electrode 2 and the reference electrode 4 is maintained at a predetermined value U. When the display electrode 2 is held at a potential lower than that of the reference electrode 4 by more than a predetermined value, or a threshold level $E_{th}$, the coloration operation is conducted. Contrarily, when the display electrode 2 is held at a potential higher than that of the reference electrode 4 by more that the threshold level $E_{th}$, the display electrode 2 is bleached.

In the driver circuit of FIG. 2, the display electrodes are selectively connected to the ground potential. Therefore, when the predetermined value U is selected at a positive value, the display electrode potential becomes lower than the reference electrode potential. The driver circuit of FIG. 2 includes a linear amplifier 11 and segment selection switches 12.

Although only one segment selection switch 12 is illustrated in FIG. 2, the segment selection switches 12 are provided for each of the segment electrodes 12 in order to properly select the display electrodes or the segment electrodes.

Figure 3:
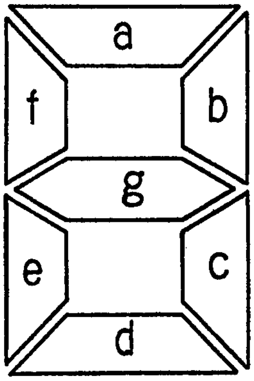
FIG. 3 is a layout of a typical seven-segment numeral display pattern.
Figure 4:
FIG. 4 is a schematic view showing display conditions of numerals 1 through 0.
Figure 5:
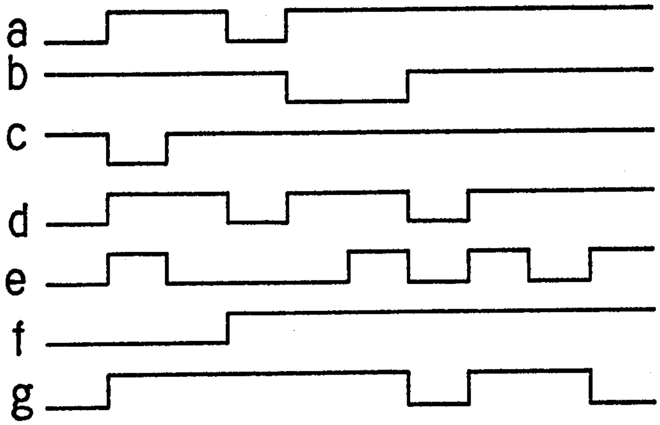
FIG. 5 is a time chart of selection signals applied to segment electrodes a through g of FIG. 3 to indicate the numerals of FIG. 4.

FIG. 3 shows a layout of a typical seven-segment numeral display pattern, FIG. 4 shows display conditions of numerals 1 through 0, and FIG. 5 shows signal waveforms applied to the respective display electrodes of FIG. 3.

Figure 6:
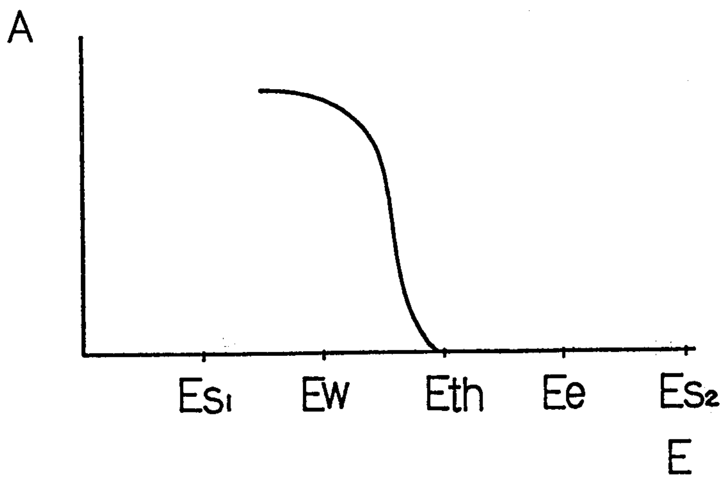
FIG. 6 is a graph showing light absorption versus electrode potential characteristics of a display segment electrode employed in the electrochromic display device of FIG. 1.

FIG. 6 shows the relationship between the potential E of the display electrode 2 and the light absorption properties A (= −log (transmittance)) of the display electrode 2 in the state of equilibrium.

In the actual system, the magnitude of the coloration voltage and the bleaching voltage is selected greater than the potential of the equilibrium state to speed up the coloration and bleaching operations. And the segment selection switches 12 are turned OFF at a desired time at which the coloration or bleaching operation is conducted to a desired degree. Thereafter, the colored segment electrodes are held in the memory state. In this drive system, the coloration operation effected to a specific segment electrode and the bleaching operation effected to another segment electrode can not be conducted at a same time.

When the coloration potential $E_w$ and the bleaching potential $E_e$ are selected at values within the range which will not produce any side reactions, decomposition of the liquid electrolyte and deterioration of the electrochromic material and the electrode can be prevented. That is, when the limit values for the side reactions are $E_{s1}$ and $E_{s2}$, the coloration potential $E_w$ and the bleaching potential $E_e$ should be selected to satisfy the following relationships.

$$E_{s1}<E_w,\ E_e<E_{s2}$$

In addition, the reaction at the counter electrode 3 must be properly controlled in order to prevent the decomposition of the liquid electrolyte and the deterioration of the counter electrode 3. This control can be easily conducted by lowering the source voltage of the linear amplifier 11. The above-mentioned drive system requires an analog circuit which ensures the stable operation at a considerably large current (several tens milliamperes per display area/$cm^2$). The segment selection switches 12 can comprise semiconductor switches.

CONSTANT CURRENT DRIVE

Figure 7:
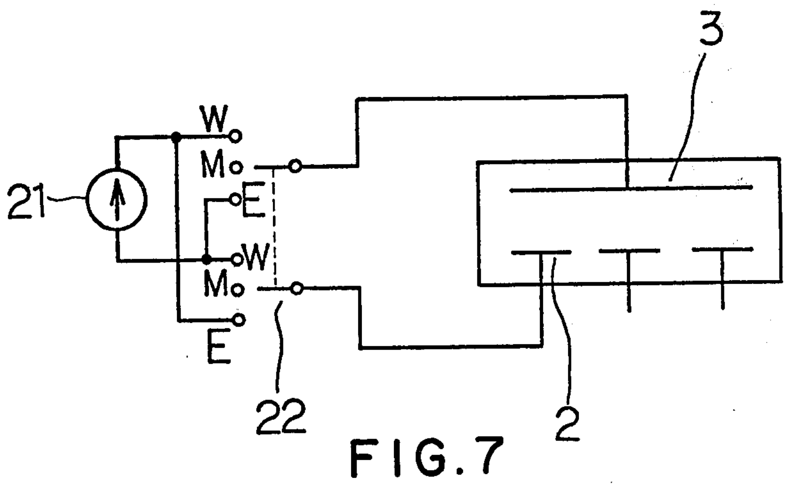
FIG. 7 is a circuit diagram of a typical driver circuit of the constant current type for ECD.

FIG. 7 shows a typical driver circuit of the constant current type, which mainly comprises a constant current source 21. A selection switch 22 is provided for each of the segment electrodes 2 to conduct the coloration and bleaching operations and to place the segment electrodes 2 in the memory state. The terminals W are for the coloration operation, the terminals E are for the bleaching operation, and the terminals M are for the memory function.

The constant current drive has the advantage that the coloration degree can be set at a desired value. Moreover, the coloration of a specific segment and the bleaching of another segment can be conducted at a same time when the constant current sources are separately provided for the respective segment electrodes.

An example of the drive system of the above-mentioned constant current drive is disclosed in copending application, CONSTANT CURRENT SUPPLY DRIVE FOR ELECTROCHROMIC DISPLAYS OF THE SEGMENTED TYPE, Ser No. 800,008, filed on May 24, 1977 by Yasuhiko Inami, Tadanori Hishida, Kozo Yano, Hiroshi Hamada and Hiroshi Nakauchi and assigned to the same assignee as the present application.

Figure 8:
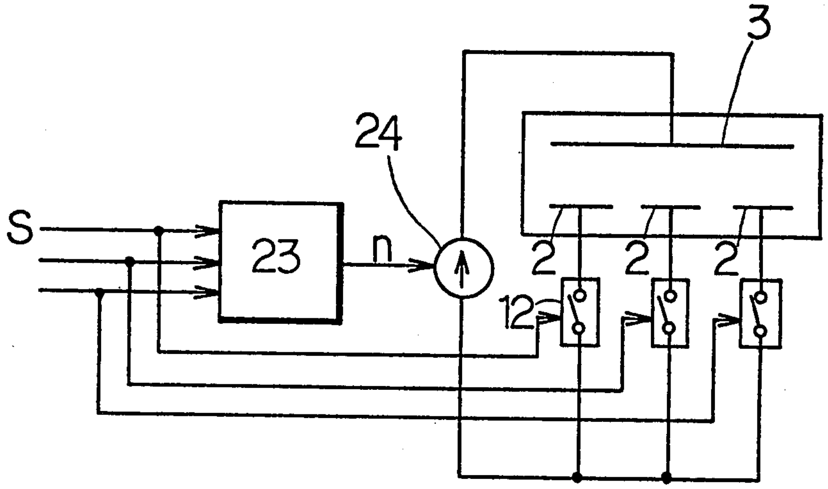
FIG. 8 is a circuit diagram of another example of a driver circuit of the constant current type for ECD.

FIG. 8 shows another example of a driver circuit of the constant current type, which mainly comprises a constant current source 24 of which an output current varies in response to a segment number signal n. The driver circuit of FIG. 8 further comprises the segment selection switches 12, and a counter 23 for counting the number of segment electrodes to be driven in response to segment signals S.

An example of the drive system of the above-mentioned constant current drive is disclosed in copending application, CURRENT CONTROLLED DRIVE SYSTEM FOR ELECTROCHROMIC DISPLAYS OF THE SEGMENTED TYPE, Ser. No. 800,009, filed May 24, 1977 by Yasuhiko Inami, Sadatoshi Takechi, Tadanori Hishida, Hisashi Uede and Hiroshi Nakauchi and assigned to the same assignee as the present application.

The charge amount flowing during the coloration operation and the bleaching operation must be strictly set at a constant value to ensure the stable operation. If the charge amount flowing during the coloration operation is larger than that flowing during the bleaching operation, the charges are accumulated during the repetition of the coloration/bleaching operations, and the thus accumulated charges produce an undesirable coloration even when the display segment is placed in the bleached condition.

Contrarily, when the charge amount flowing during the bleaching operation is greater than that flowing during the coloration operation, undesirable side reactions such as the decomposition of the liquid electrolyte and the deterioration of the display electrode will occur. Such side reactions can be prevented by controlling the variation range of the voltage level of the constant current source.

CONSTANT VOLTAGE DRIVE

Figure 9:
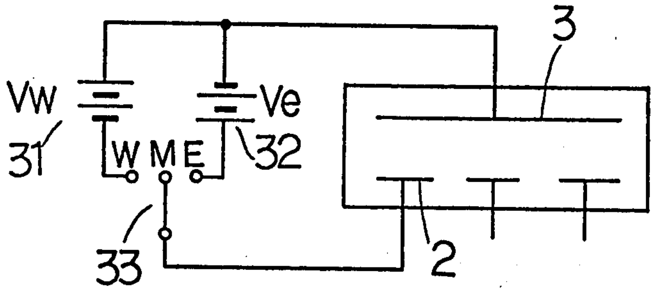
FIG. 9 is a circuit diagram of a typical driver circuit of the constant voltage type for ECD.

FIG. 9 shows a typical driver circuit of the constant voltage type, which mainly comprises a coloration constant voltage source 31, a bleaching constant voltage source 32, and a selection switch 33. It is not necessarily required that the coloration voltage $V_w$ and the bleaching voltage $V_e$ have the same level.

Figure 10:
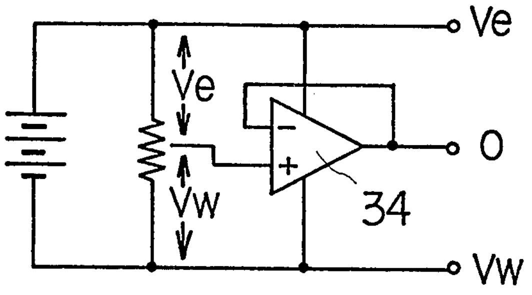
FIG. 10 is a circuit diagram of an example of a constant voltage source for the driver circuit of the constant voltage type.

FIG. 10 shows an example of the constant voltage source, wherein the coloration voltage $V_w$ and the bleaching voltage $V_e$ are derived from one power source. The constant voltage source of FIG. 10 is suited for the simultaneous coloration/bleaching technique, since the circuit of FIG. 10 minimizes the power dissipation in the simultaneous coloration/bleaching technique. The circuit of FIG. 10 mainly comprises a linear amplifier 34.

The constant voltage drive technique is superior to the remaining two drive techniques, since the circuit construction is simple and the power dissipation is minimized.

As already discussed above, it is a great advantage that the electrochromic display inherently possesses the memory characteristics. However, it is important that every segment electrode should be colored to a uniform level in order to enhance the visibility. For example, when the coloration operation is conducted to a display electrode which has been placed in the coloration memory state, the coloration is superimposed and, therefore, the coloration degree becomes higher than that of the display electrode which has been placed in the bleached state and then the coloration operation is conducted to.

In order to avoid the above defects, two methods are proposed.

ENTIRE ERASE TECHNIQUE

In the entire erase technique, the entire display segments are once bleached after completion of one pattern display and, then, the coloration operation is conducted to desired display segments. A typical system for conducting the entire erase technique was disclosed in U.S. Pat. No. 3,950,936 entitled "DEVICE FOR PROVIDING AN ELECTRO-OPTICAL DISPLAY OF TIME" on Apr. 20, 1976.

PARTIAL ERASE TECHNIQUE

In this technique, in transition of a visual display from a specific display pattern to another, the voltage signal is applied only to one or more display segments which are not common to the two display patterns, while no voltage signal is applied to the remaining display segments which are common to the two display patterns.

Now assume that the numeral information is displayed through the use of the seven segments a through g shown in FIG. 3, and a visual display is desired to be changed from the numeral "2" to "3". It will be obvious from FIGS. 3 through 5 that the segments a, b, d, e and g should be ON in order to display "2" while the segments a, b, c, d and g should be ON in order to display "3". In other words, the four segments a, b, d and g are common to "2" and "3". The segment e should be bleached and the segment c should be colored. That is, the number of segments to be driven is greatly reduced and, therefore, the power dissipation is greatly reduced.

The above-mentioned partial erase techqnique is desribed in detail in copending application, DRIVING TECHNIQUE FOR ELECTROCHROMIC DISPLAYS OF THE SEGMENTED TYPE, Ser. No. 751,819, filed Dec. 17, 1976 by Hisahsi Uede, Yasuhiko Inami, Hiroshi Hamada, Tadanori Hishida and Hiroshi Nakauchi and assigned to the same assignee as the present application.

The present invention can be combined with the above-mentioned three driving methods. Especially, the driving system of the present invention is effectively combined with the constant voltage type drive employing the partial erasing technique.

The drive system of the present invention will be discussed with reference to FIGS. 1, 3 through 5, and 11 through 13.

The electrochromic display cell of the FIG. 1 construction is fabricated in the following way.

The transparent substrates 1 are made of soda lime glass. An $In_2O_3$ layer is formed on one of the glass substrates 1 to provide the display electrode 2. The $In_2O_3$ layer is formed to 2000 Å thick through the use of the electron beam evaporation technique. Another $In_2O_3$ layer is formed on the other glass substrate 1 to 2000 Å thick through the use of the electron beam evaporation technique, the thus formed $In_2O_3$ layer functioning as the counter electrode 3 and the reference electrode 4. The sheet resistance value of the thus formed display electrode 2, the counter electrode 3 and the reference electrode 4 is 20Ω/sq.

Thereafter, the films 7 and 7′ are formed on the display electrode 2 and the counter electrode 3, respectively, through the use of a thermal evaporation method. The films 7 and 7′ are formed of a $WO_3$ film of 5000 Å thick. The evaporation condition is as follows:
substrate temperature: 350° C.
evaporation rate: 10 Å/sec.
pressure: $5\times10^{-4}$ Torr ($O_2$ leak)

The $WO_3$ film is formed on the substantially entire surface of the counter electrode 3 and on the display surface of the display electrode 2 through the use of the mask evaporation method.

Thereafter, the display electrode 2 ($In_2O_3$ layer) is divided into segments through the use of a photo-etching method employing the etchants comprising $FeCl_3$ and HCl. Lead electrode portions of the display electrode 2 are coated with the insulator film 8 made of silicon resin through the use of a screen printing method.

The thus formed two glass substrates 1 are fixed to each other with the intervention of a spacer 5 made of glass bars of 1 mm square. The liquid electrolyte 6 comprising "Cellosolve acetate" ($CH_3COOC_2H_4OC_2H_5$) manufactured by U.C.C. company mixed with $LiClO_4$ by 1.0 mol/l is filled within the cell. The liquid electrolyte 6 is mixed with $BaSO_4$ by 1:1 weight ratio to provide a white background.

To clarify the drive system of the present invention, the following test was conducted.

The coloration operation is conducted to one segment at the charge density of 5 mC/cm$^2$. The segment is colored to a level which shows a contrast ratio 3:1, and the segment electrode potential is −0.2 V with respect to the reference electrode in the memory state. The other coloration operation is conducted to another segment at the charge density of 10 mC/cm$^2$. The segment is colored to a level which shows a contrast ratio 8:1, and the segment electrode potential is −0.5 V with respect to the reference electrode in the memory state. The thus colored two segments are electrically connected to each other.

Electric current flows between the two segments and the coloration degree is uniformed. The time constraint required for this uniforming operation is about one second.

Figure 11:
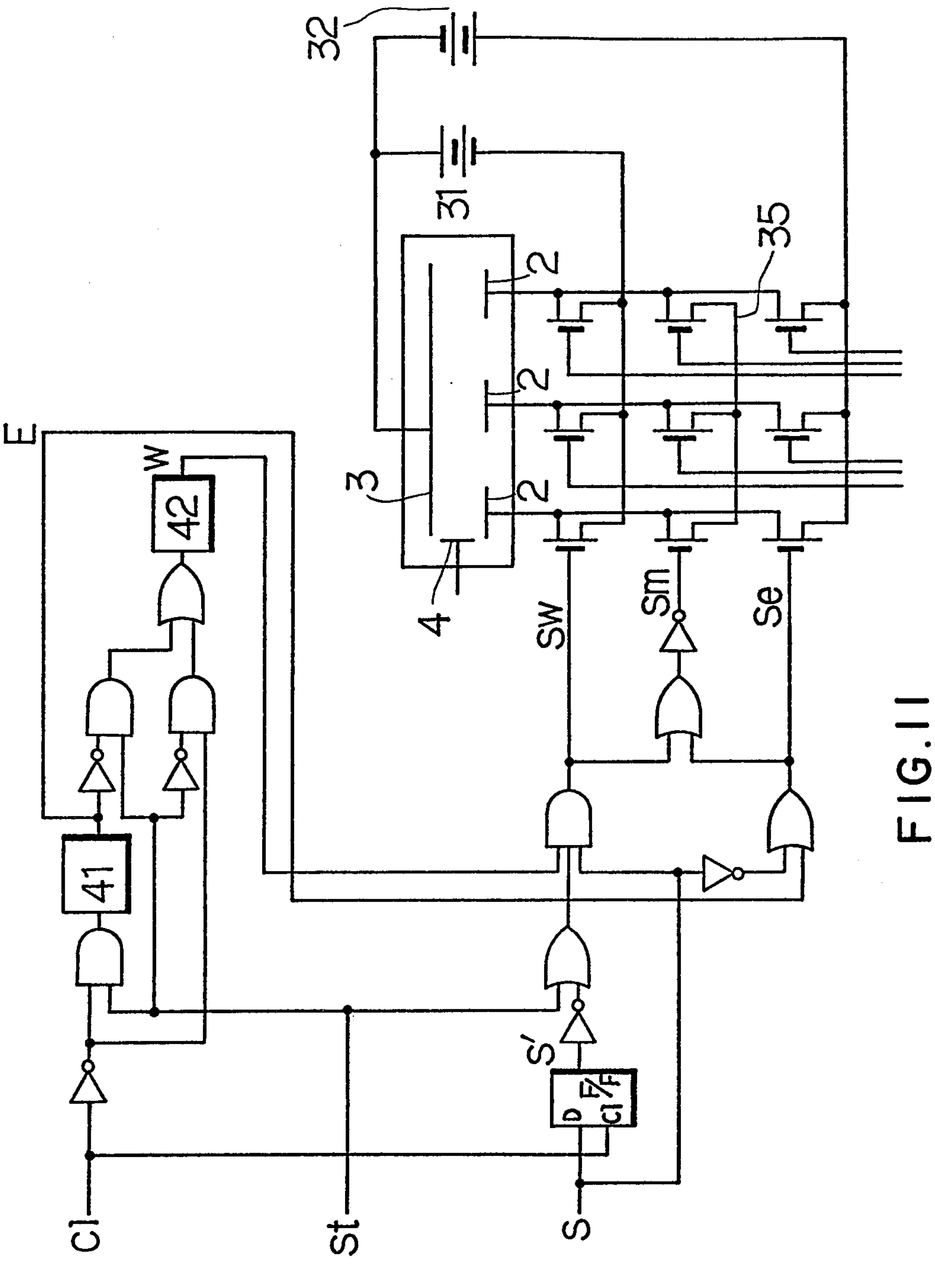
FIG. 11 is a block diagram of an embodiment of a driver circuit of the present invention.
Figure 12:
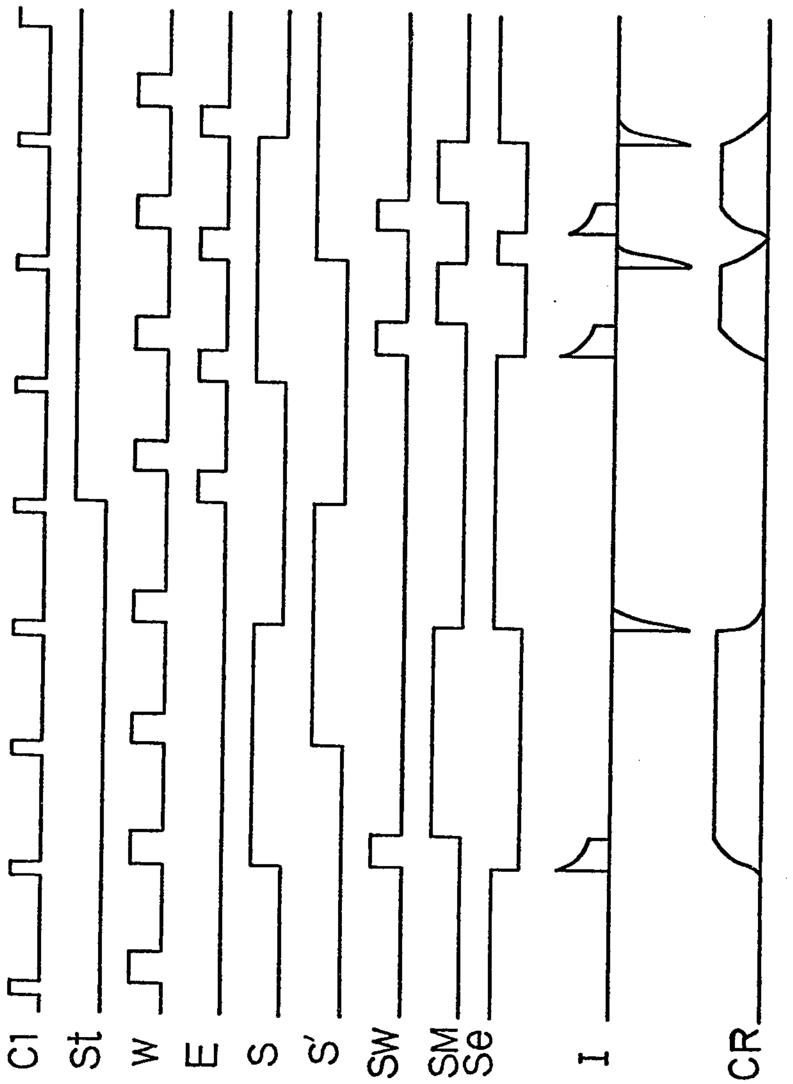
FIG. 12 is a time chart showing various signals occurring within the driver circuit of FIG. 11.

FIG. 11 shows an embodiment of a driver circuit of the present invention suited for driving the numeral display as shown in FIG. 3. FIG. 12 shows various signals occurring within the circuit of FIG. 11.

The respective segments 2 are driven by segment signals S as shown in FIG. 5. A one-shot multivibrator 42 develops a write-in pulse W in response to the trailing edge of a clock pulse C1, the write-in pulse W determining the time period during which the coloration voltage is applied to the segment. A strobe signal St is developed at a desired time to regenerate the memory condition. When the strobe signal St is developed, the segments are bleached at once and the coloration operation is again conducted to desired segments. In the circuit of FIG. 11, when the strobe signal St is developed, all of an erase pulse E is first developed and the write-in pulse W is developed thereafter.

The above-mentioned strobe technique is discussed in detail in the above-mentioned copending application, DRIVING TECHNIQUE FOR ELECTROCHROMIC DISPLAYS OF THE SEGMENTED TYPE, Ser. No. 751,819.

A data flip-flop F/F develops a delayed segment signal S′ which corresponds to the segment signal S of the previous cycle. The thus developed delayed segment signal S′ is compared with the present segment signal S in order to connect the segment 2 to a coloration voltage source 31 only when the segment signal S is changed from the logic "low" to the logic "high". The segment signal S is controlled in synchronization with the trailing edge of the clock pulse C1.

After completion of the coloration operation, the colored segments are placed in the coloration memory state and connected to a memory line 35. That is, the colored segments are connected to each other through the memory line 35 during the memory period in order to uniform the coloration degree of the respective segments. When the segment signal S takes the logic "low", the segment 2 is connected to a bleaching voltage source 32 to conduct the bleaching operation.

When the strobe signal St takes the logic "high", a one-shot multivibrator 41 develops the erase pulse E to bleach the entire segments. The strobe signal St must be controlled so that the strobe signal St will not change its logic value during a time period at which the write-in pulse W or the erase pulse E is developed.

More specifically, the respective segments are connected to any one of the coloration voltage source 31, the memory line 35 and the bleaching voltage source 32 in accordance with the following segment write-in signal $S_w$, segment memory signal $S_m$ and segment erase signal $S_e$.

$$S_w = S\cdot W\cdot(\overline{S'} + S_t)$$

$$S_m = \overline{S_w + S_e}$$

$$S_e = \overline{S} + E$$

Figure 13:
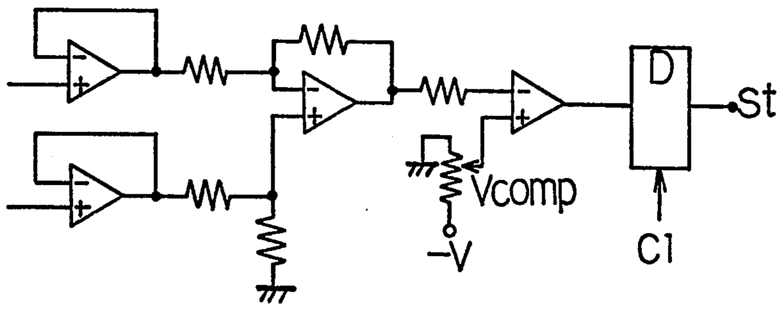
FIG. 13 is a circuit diagram of an embodiment of a strobe signal generator for applying a strobe signal to the driver circuit of FIG. 11.

The strobe signal $S_t$ can be manually developed, or can be automatically developed at a predetermined time interval. The other way to develop the strobe signal $S_t$ utilizes a circuit shown in FIG. 13. As already discussed above, the coloration degree of the segments is proportional to the voltage level of the respective segments. The circuit of FIG. 13 is constructed so as to detect the voltage level of the memory line 35 and to develop the strobe signal St when the detected level is positive with respect to a preselected level.

In the FIG. 12 time chart, I represents the current flowing through the ECD cell, and CR represents the contrast ratio between the coloration state and the bleached state.

The above-mentioned ECD cell is now under the life test for longer than six months. In one system, the ECD is connected to a counter for sequentially displaying the numerals 0 through 9, the numeral information being changed at every eight second interval. In the other system, the ECD is connected to a timepiece module for displaying the current hour and minute information. The drive condition is as follows:

CONSTANT VOLTAGE DRIVE

Write-in Voltage $V_w$=0.5 V
Write-in Period $\tau_w$=500 msec.

Erase Voltage $V_e$=2.5 V

Erase Period $\tau_e$ in the Strobe Operation=500 msec.

Under these conditions, the charges more than 5 $mC/cm^2$ flows through the cell, and the contrast ratio is greater than 3:1 against the wavelength 590 nm.

CONSTANT POTENTIAL DRIVE

Write-in Potential $V_w$=0.1 V

Write-in Period $\tau_w$=500 msec.

Erase Potential $V_e$=1.5 V

Erase Period $\tau_e$=500 msec.

The coloration operation is similar to the first above case.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In a drive system for driving an electrochromic display cell during a coloration period, and a bleaching period, said display cell having a memory period when said drive system is not driving said electrochromic display cell, said drive system including an external power source, said cell including an electrochromic material and a predetermined number of display electrodes, different combinations of said display electrodes defining different desired display patterns, said drive system comprising:

coloration means for conducting coloration operations by applying a coloration voltage to selected ones of said display electrodes during said coloration period; and communication means responsive to the absence of the conducting of said coloration operations to said selected ones of said display electrodes by said coloration means for electrically connecting said selected ones of said display electrodes together during said memory period, said external power source being disconnected from said selected ones of said display electrodes during said memory period, thereby maintaining the degree of coloration of the selected ones of said display electrodes uniform.

2. The drive system of claim 1, wherein said communication means comprises a conductive memory line attached to each of said selected display electrodes; and switching means responsive to the absence of the conducting of said coloration operations to said selected display electrodes by said coloration means for selectively connecting each of said selected display electrodes to said conductive memory line.

3. The drive system of claim 2, which further comprises:

detection means connected to said memory line via a circuit means for detecting a potential level of said conductive memory line; and regeneration means responsive to said potential level detected by said detection means for regenerating the coloration of said selected display electrodes when the potential level of said conductive memory line becomes positive with respect to a predetermined potential level.

4. The drive system of claim 3, wherein said regeneration means comprises:

erase means for bleaching all of said display electrodes; and write-in means responsive to the termination of the bleaching of said display electrodes by said erase means for coloring said selected ones of said display electrodes.

5. The drive system of claim 1, wherein said coloration means applies a coloration voltage of a predetermined level to said selected ones of said display electrodes for a predetermined time period.

6. The drive system of claim 5, wherein said coloration voltage is applied to said selected ones of said display electrodes only when said display electrode should be changed from a bleached state to a coloration state when changing the visual display of said electrochromic display cell from a specific display pattern to another display pattern.

7. The drive system of claim 1, which further comprises bleaching means for conducting bleaching operations by applying a bleaching voltage to at least one of said selected ones of said display electrodes; and wherein said at least one of said selected display electrodes is connected to said communication means after receiving said coloration voltage, said at least one of said selected display electrodes remaining connected to said communication means until said at least one of said display electrodes receives said bleaching voltage from said bleaching means.

8. The drive system of claim 7 wherein said coloration means comprises:

write pulse generating means for generating a series of write pulses for performing said coloration operations;

first switching means responsive to energization by said write pulses for switching to an ON state in response thereto thereby conducting said coloration operations by applying said coloration voltage to said selected ones of said display electrodes;

wherein said bleaching means comprises;

erase pulse generating means for generating a series of erase pulses for performing said bleaching operations;

second switching means responsive to energization by said erase pulses for switching to an ON state in response therto thereby conducting said bleaching operations by applying said bleaching voltage to said at least one of said selected ones of said display electrodes; and wherein said communication means comprises;

third switching means responsive to the absence of energization of said first switching means by said write pulses or of energization of said second switching means by said erase pulses for switching to an ON state thereby connecting said selected ones of said display electrodes to said communication means and maintaining the degree of coloration of said selected ones of said display electrodes uniform.

* * * * *